UNITED STATES PATENT OFFICE.

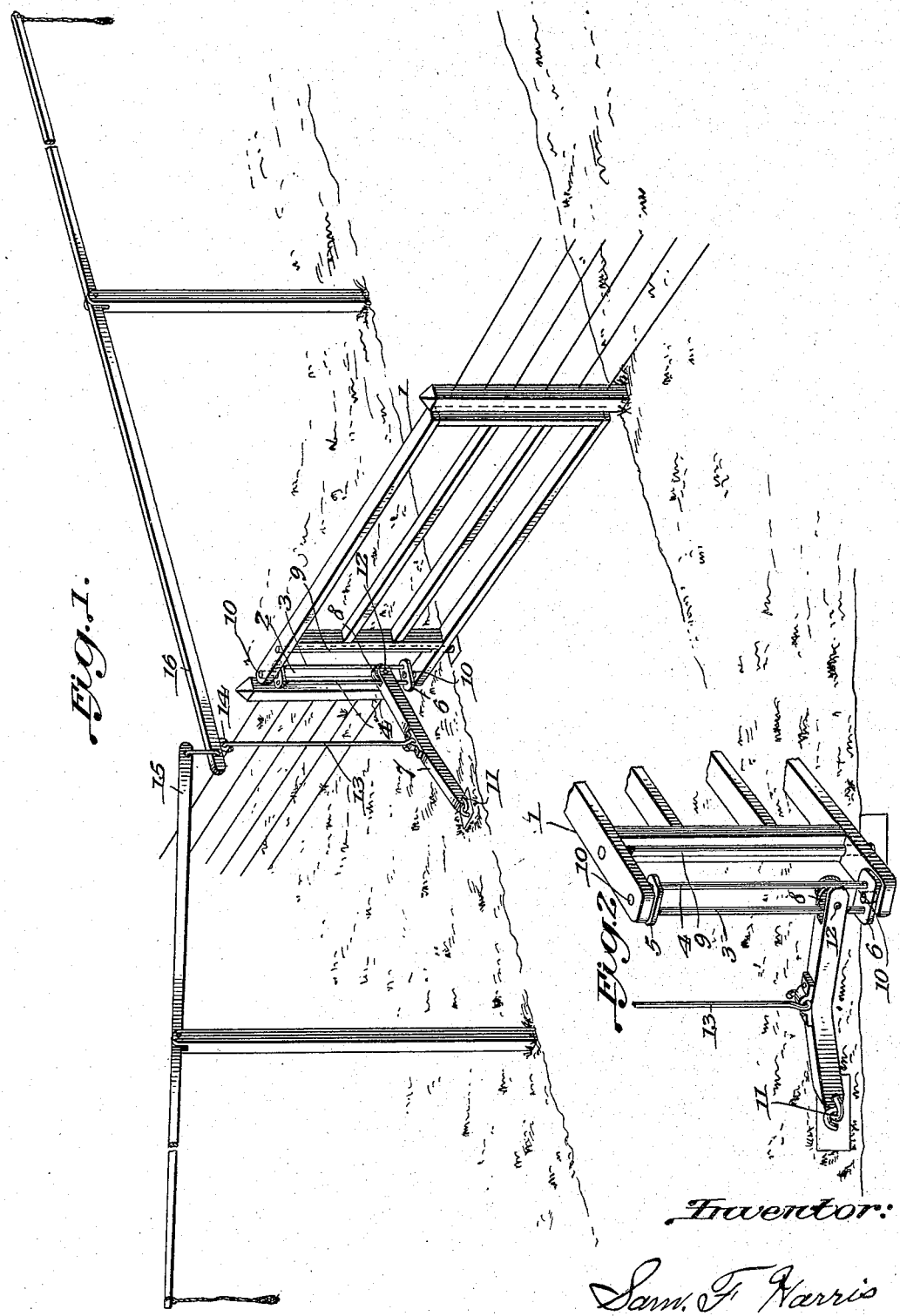

SAMUEL F. HARRIS, OF SMYRNA, TENNESSEE.

GATE-OPERATOR.

1,171,119.　　　　　　Specification of Letters Patent.　　Patented Feb. 8, 1916.

Application filed April 8, 1915. Serial No. 20,099.

*To all whom it may concern:*

Be it known that I, SAMUEL FRANKLIN HARRIS, a citizen of the United States, residing at Smyrna, in the county of Rutherford, State of Tennessee, have invented a new and useful Gate-Operator, of which the following is a specification.

The invention relates to gate operators for swinging gates and has for its object to provide a simple and efficient operator especially for heavy wooden and iron gates which will be positive in its operation.

A further object of the invention is to provide a gate operator which may be actuated from a vehicle without alighting therefrom, and which will serve to lock the gate in either open or closed position.

In the accompanying drawing forming part of this specification and in which like reference characters indicate corresponding parts; Figure 1 is a perspective view of a gate and operator applied thereto, the gate being in closed position, and Fig. 2 is a perspective view of a portion of the gate operator the gate being shown in open position.

Referring to the drawings, numeral designates a gate hinged near one end adjacent to a roadway and adapted to swing across it. The upper and lower bars of the gate are extended rearwardly beyond the pivot of the gate and are connected by a hinged guide 2. This guide consists of two parallel bars 3 and 4 connected at their ends by blocks 5 and 6, each having a bolt pivoted respectively in the upper and lower bars of the gate.

A lever 7 is pivoted at one end by means of ring 11 and a staple at one side of the gate and is provided at the other end with a grooved roller 8 fitted to move between the parallel bars 3 and 4. The roller moves freely on the pivot rod 12. Near the center of the lever 7 is pivoted an operating link 13 connected at its upper end by means of an eye bolt to an operating lever 16 pivoted to a post at one side of the gate. A second operating lever 15 is pivoted to a post at the other side of the gate and is connected to the lever 16 by means of a rod. The outer ends of the levers 15 and 16 are provided with depending handles. When the gate is closed or open the lever 7 lies in a horizontal position and serves as a brace to securely retain the gate either open or closed.

The operation is as follows: A person approaching the gate from either side pulls down on one of the handles and through the lever and link swings the lever 7 upward, the roller moving between the bars 3 and 4 swings the gate on its pivot. The momentum of the gate carries it past a dead center after which the lever 7 moves down into the position shown in Fig. 2 where the bar serves as a brace to retain the gate open. As the roller moves along the guide 2 the latter moves freely on its pivot 10. When the gate is to be closed the operator pulls down on the other handle and the lever 7 moves back to its original position. The advantage of the construction is apparent as the gate can be swung by a person from either side and securely held in its final position.

Changes in the form, proportion and minor details of construction within the scope of the appended claims may be resorted to without departing from the spirit of the invention.

I claim:—

1. The combination of a gate pivoted adjacent to one end on a vertical pivot and having bars extending rearwardly beyond its pivot, a guide hinged in said extended bars, said guide including a pair of parallel bars, a lever pivoted at one end at one side of the gate and provided at the opposite end with a grooved roller fitted to move between the parallel bars and means connected to the lever for rocking it on its pivot whereby the roller is moved along the parallel bars to swing the gate.

2. The combination of a gate pivoted adjacent to one end and having rearwardly extending bars, a guide pivoted in said bars, a lever pivoted at one end at one side of the gate and provided at the other end with a roller fitted to move in said guide when the lever is rocked, and operating levers pivoted at both sides of the gate and connected to the said lever to rock the same whereby the gate is swung on its pivot.

SAM F. HARRIS.

Witnesses:
　JOHN SHORES,
　FRANK LEHNING.

Copies of this patent may be obtained for five cents each, by addressing the "Commissioner of Patents, Washington, D. C."